Patented June 3, 1952

2,599,185

UNITED STATES PATENT OFFICE 2,599,185

REFRACTORY BODY

Jack M. Lepp and John A. Slyh, Columbus, Ohio, assignors, by mesne assignments, to Battelle Development Corporation, Columbus, Ohio, a corporation of Delaware No Drawing. Original application February 12, 1949, Serial No. 76,188. Divided and this application April 25, 1950, Serial No. 158,087

3 Claims. (Cl. 106—56)

This invention relates to refractory bodies having excellent thermal shock and strength properties. In particular, it relates to refractory bodies sintered from mixtures of aluminum and alumina and is a division of application No. 76,188, Jack M. Lepp and John A. Slyh, filed February 12, 1949, entitled "Refractory Bodies," now Patent No. 2,568,157, September 18, 1951.

There is a great need in industry and commerce for refractory bodies having good thermal shock resistance and strength. Such bodies are required where there are high or sudden changes in temperature and pressure. They are, thus, invaluable where it is desired to protect structural metallic parts, for example, as linings for exhaust ports of engines, fuel burning chambers, or catalytic reactors.

Metallic oxides are generally inert at high temperatures, and the supposition is that refractory bodies produced from alumina would have excellent heat-resisting and shock-resisting properties, as alumina melts in the neighborhood of 3700° F. It is known, however, that, although the strength of alumina bodies increases on an increase in the sintering temperatures up to a practical limit of 3500° F., such bodies exhibit poor thermal shock resistance when subjected to a flame at 4000° F. Even at flame temperatures of 3800° F., these alumina bodies show severe spalling, cracking, and erosion. On the other hand, bodies molded from finely divided aluminum and then sintered, have good strength and good thermal shock properties at low temperatures, but they are useless at temperatures near the melting point of aluminum which melts at about 1200° F.

Attempts have been made to produce refractory bodies by sintering unprotected mixtures of alumina and aluminum in argon gas or a similar inert atmosphere. Such bodies have not been satisfactory. For example, mixtures having an aluminum content of 21% by weight sintered at 1500° F., in argon, showed fair thermal shock resistance but very poor strength, as the modulus of rupture of such bodies was only 200 lbs./sq. in. With an aluminum content of 35% to 51% by weight, the strength was increased only 100 lbs./sq. in.

It is, therefore, an object of this invention to provide refractory bodies made from mixtures of alumina and aluminum having good thermal shock resistance and strength.

It has now been found possible to produce refractories from mixtures of aluminum and alumina having good thermal shock resistance and strength by sintering them while surrounded by a mass of powdered graphite under an oxidizing atmosphere. The resulting refractories do not show any spalling, erosion or cracking when heated to temperatures up to 3700° F. Their strengths, as exhibited by their modulus of rupture, ranged from 800 to 12,400 lbs./sq. in.

Generally, this process involves mixing finely divided alumina and aluminum together with enough binder so that the pressed body will have sufficient "green" strength to retain its shape when handled. After molding, the body is placed in a graphite crucible or container and completely covered with finely divided graphite which is thoroughly tamped around the body. This container is then placed inside a second, larger, clay-graphite crucible or container and also surrounded by finely divided graphite which is tamped around the smaller crucible. The entire assembly is then heated to sintering temperatures in an oxidizing atmosphere which results in a refractory having the above characteristics.

The quality of aluminum used in the preparation of the molded body can be of commercial grade. The small amount of impurities in the commercial grades of aluminum are not objectionable. Finely divided aluminum is preferred, since it facilitates thorough mixing and the production of not only denser but stronger bodies. The mesh size of the aluminum, however, is not too critical, for during mixing with alumina in a ball mill or similar equipment, the softer aluminum particles will tend to break down and mechanically plate the harder alumina particles. Furthermore, since the temperatures used are higher than the melting point of alumina, it will flow and wet during sintering tending to form a continuous phase of aluminum. Aluminum, 99 per cent minus 325 mesh, has been used in these mixtures to produce excellent bodies. Mesh sizes of from 100 to 900 can be employed to provide very satisfactory results.

The quantity of aluminum in the molded mixture should vary from about 5% to 95% by weight. It is preferred to use from about 10% to about 65% by weight of aluminum.

Commercial grade alumina has produced excellent results. It is not necessary to use the chemically pure material as the impurities present in the commercial grade of alumina do not appear to adversely affect the resulting refractory. The alumina can vary in size from 65 mesh to 900 mesh (about 5 microns), which are the preferred ranges. A decrease in mesh size will, in most cases, provide an increase in strength in the sintered body as the body is more dense. Excellent results have been obtained from using alumina in mesh sizes of 900 and also mixtures of 1 part 900 mesh and 1 part —65+100 mesh. The quantity of alumina in the molded mixture before sintering can vary from 5% to 95% by weight. A refractory body made from a mixture of 90% alumina and the balance aluminum had satisfactory thermal shock resistance and strength. Sintering molded mixtures having as low as 35% alumina by weight produced refractories having good strength and thermal shock resistance. Mixtures containing less than about 35% alumina result in sintered bodies that are generally unsatisfactory due to distortion and lack of proper refractoriness from the high aluminum content. It is, therefore, preferred to sinter molded mixtures containing from about 35% to about 90% by weight of alumina.

The aluminum and alumina are thoroughly mixed together in a ball mill. Any commercially available mixing machinery, however, can be used which will provide a thorough and intimate mixture of these two ingredients. The mixing time is not particularly critical, for it is only necessary to obtain thorough mixing of the ingredients. About fifteen to thirty minutes will usually be required to mix the coarser grades of alumina and aluminum, while the finer mesh sizes can be mixed in about an hour. For the mesh sizes disclosed herein, about thirty minutes mixing time is preferred.

After mixing, a molding binder or carrier is added to the mixture to provide a composition that will have sufficient "green" strength to retain its shape when handled. The binder material is not very critical. A solution of 2% by weight of cellulose gum in water has been found satisfactory for the purposes of this invention. Wax or paraffin can be substituted therefore to obtain equivalent results. The binder should theoretically decompose or burn-off during the sinter leaving no objectionable compounds or impurities in the refractory.

The mixture containing the molding binder should then be placed in any conventional molding equipment and molded into the desired configuration by pressing. Very satisfactory results have been obtained when using a pressure of 5 tons per square inch. Substantially greater pressures than this may be used if they do not cause lamination of the body on release of the pressure and ejection of the molded body.

Chalky bodies are produced when mixtures of alumina and aluminum are not protected from excessive attack by injurious gases like oxygen, carbon monoxide, hydrogen, etc., during the sinter and while cooling. To protect the bodies during sintering they are completely covered with a layer or layers of graphite. The layer must be of sufficient density to exclude these gases. Graphite surfaces exposed to the hot furnace gases may tend to burn down about 3 to 5 inches during the sinter, and the outer clay-graphite container can be partially consumed. Therefore, the graphite layers should be thick enough to last through the sintering period and through the cooling period while they are still hot and subject to combustion. To achieve these results, the bodies are covered and packed with powdered graphite in a graphite container. This container is then placed inside a larger clay-graphite crucible and covered and packed with more powdered graphite. The inner container can also be inverted in order that gases passing through the containers and layers of graphite will have to follow a longer and more tortuous route, thereby further protecting the bodies. Instead of using two graphite containers it is obvious that the inner container can be dispensed with and only a single large graphite container used with a very thick, dense layer of powdered graphite between the container walls and the molded bodies. It is also possible to entirely dispense with the graphite or carbon containers and to thoroughly pack the powdered graphite in a thick, dense mass around the molded bodies.

While the particle size of the graphite is not too critical, it should still be of a sufficient size to be readily packed and tamped around the molded articles or the graphite container to form a dense mass. Powdered or finely divided graphite is preferred. The thickness of each layer of graphite can be from 2 to 5 inches, and it is preferred that each layer be about 3 inches thick. It is realized, of course, that the thickness of the layers will vary somewhat depending on the size and thickness of the graphite container or crucible and the number and size of articles to be sintered. Other materials can be substituted if desired for the powdered graphite and which will protect the molded bodies at high temperatures from the hot gases, do not burn off readily at high temperatures, and which do not adversely affect the molded bodies.

The thicknesses of the sides of the graphite container and clay-graphite crucible can vary from ⅜ to 1 inch. It is preferred that the thickness about ½ to ¾ inch as this provides sufficient strength. In place of a graphite container and a clay-graphite crucible other suitable holders made of carbon or similar refractory materials can be used.

Any type of high temperature gas-fired furnace can be used to sinter the molded bodies. The molded mixtures surrounded by their protective layer of graphite can also be sintered in electric furnaces as well as gas-fired furnaces. The combustible atmosphere in the furnace is preferably a mixture of natural gas and air. Other acceptable gaseous mixtures that can be employed are carbon monoxide and air, methane and air, etc.

Sintering temperatures can range from 1200° F. to 3300° F. It is preferred, however, that the sintering temperature range from 1500° F., to 3100° F., for in these ranges bodies are produced having excellent thermal shock resistance and strength. The heating time can vary from 2 to 4 hours. It is preferred to heat the small bodies disclosed herein for about three hours at temperatures of 1500° F., to 3100° F. If the molded articles are heated for less than about 2 hours, the resulting refractory lacks strength and thermal shock resistance. Heating for over four hours does not materially improve the thermal shock resistance and strength of the resulting refractories, and, furthermore, the bodies can become damaged through greater loss of the protective graphite layers due to longer burning. It is, of course, obvious to those skilled in the art that massive bodies will require thicker protective layers of graphite and correspondingly longer heats due to the larger volumes employed.

The following example will serve to illustrate more fully the method of practicing the invention to those skilled in the art.

79% by weight of 900 mesh alumina and 21% by weight 99% minus 325 mesh aluminum were blended in a porcelain ball mill for thirty minutes and then were tempered to a molding consistency with an aqueous solution containing two per cent by weight of cellulose gum. At a pressure of 10,000 lbs./sq. in., rectangularly shaped bodies $\frac{5}{16}''\times\frac{5}{16}''\times 3''$ were formed from the mixture. The bodies were then placed in a graphite container having sides ⅜ of an inch thick and were completely covered with powdered graphite. The powdered graphite was then tamped to form a dense mass 3 inches thick about the bodies. A graphite cover was placed on the top of the container which was inverted and then put inside a larger clay-graphite crucible having sides ⅝ inch thick. The container inside the crucible was completely covered with more powdered graphite which was packed or tamped. This second layer of packed, powdered graphite was also about 3 inches thick. A cover was then placed on the top of the crucible and sealed with fire clay. The crucible was then placed on supports in the furnace and gas fired (oxidizing atmosphere). The temperature in the furnace was maintained at 2500° F., for three hours. After sintering, the refractories were allowed to furnace cool while protected by the graphite layers, which took about 24 hours. After cooling, they were removed from the protective covering of graphite, X-rayed, and found to contain aluminum, alumina, aluminum nitride, and carbon. Some of the refractories were subjected to strength tests and some to thermal shock resistance tests. To determine the thermal shock resistance, a torch firing test was used. The heat was supplied by an automatic torch, using a mixture of natural gas at 60 lbs./sq. in., and oxygen at a pressure of 80 lbs./sq. in. Flame temperatures produced ranged from 3600° F. to 4200° F., for about sixty seconds. The temperature of the sintered body was below 3700° F. The strength of the refractory as shown by its modulus of rupture was determined by cross-breaking. The strength of the refractories was 4400 lbs./sq. in., and their thermal shock resistance was good in that there was no spalling, cracking or erosion.

Other bodies were formed of aluminum and alumina containing various amounts of each ingredient and were sintered for three hours while packed in powdered graphite under oxidizing atmospheres at temperatures of 1500° F., 2500° F., and 3100° F. The refractories were tested, and the results obtained are shown in Table A below:

mosphere, the resulting refractories also exhibited good thermal shock resistance properties. Their strengths are shown in Table B below:

TABLE B

*Effect of mesh size of alumina in refractories*

[Modulus of rupture lbs./sq. in. at room temperature]

| Type Alumina | 20% Aluminum Balance Alumina Before Sintering | 25% Aluminum Balance Alumina Before Sintering | 30% Aluminum Balance Alumina Before Sintering |
|---|---|---|---|
| −65 mesh | 2,200 | 2,570 | 3,025 |
| −65-325 mesh | 2,020 | 2,345 | 2,620 |
| 1 part −65-100 mesh, 1 part 900 mesh | 4,770 | 4,450 | 2,960 |
| 900 mesh | 3,060 | 4,610 | 4,100 |

During sintering and while the bodies are cooling, it is believed that the thick, dense layer of powdered graphite prevents atmospheric or furnace gases in large amounts from attacking the bodies to result in chalky refractories or refractories lacking good thermal shock resistance and strength. Furthermore, it would appear that this graphite covering may also prevent escape of any gas like nitrogen in and around the molded mixtures so that it can react at high temperatures with the metallic aluminum to produce aluminum nitride in an amount sufficient to provide sintered bodies having excellent thermal shock resistance and strength. On the other hand, it is conceivable that the nitrogen which forms aluminum nitride can come from part of the nitrogen which has been absorbed by the graphite or from the furnace atmosphere which may seep or diffuse through the graphite covering at a very reduced rate. Since oxygen would undoubtedly also be present with the nitrogen in the furnace gases, in the graphite, or entrapped in and around the molded mixtures, there is reason to believe a small portion of the metallic aluminum would be converted to aluminum oxide. It is not precisely known in what form the aluminum nitride or aluminum oxide produced from metallic aluminum occurs. They may exist as thin layers on the outer surfaces on the metallic aluminum particles or on the outer surface of the continuous phase of aluminum after it has melted and wet. Very small aluminum particles may be entirely converted to the nitride or the oxide; or it may be that more aluminum is converted to aluminum nitride or

TABLE A

*Properties of refractory bodies made from mixtures of aluminum and alumina*

| Per Cent by Weight Before Sintering | | Modulus of Rupture at Room Temperature, lbs./sq. in., Sintered in Graphite at — | | | Thermal Shock Resistance, Sintered in Graphite at — | | |
|---|---|---|---|---|---|---|---|
| Alumina[1] | Aluminum[2] | 1500° F. | 2500° F. | 3100° F. | 1500° F. | 2500° F. | 3100° F. |
| 100. | 0. | 130 | 2,100 | 8,600 | Poor | Poor | Poor. |
| 90. | 10. | 1,000 | 1,400 | 1,700 | Good | Good | Excellent. |
| 79. | 21. | 800 | 4,400 | 3,300 | do | do | Do. |
| 65. | 35. | 1,300 | 9,800 | 3,100 | do | do | Do. |
| 48.5 | 51.5 | 3,800 | 11,600 | 2,900 | do | do | Do. |
| 35. | 65. | 3,200 | 12,400 | 5,600 | do | do | Do. |
| 0. | 100. | 10,800 | 9,500 | 9,300 | | | Good. |

[1] 900 mesh in size.
[2] 99%, minus 325 mesh in size.

Bodies were also made containing alumina of various mesh sizes and 99%, minus 325 mesh aluminum. Packed in graphite and sintered at 3100° F., for three hours under an oxidizing atoxide near the surfaces of the bodies than in their centers. In any event, the aluminum nitride and aluminum oxide which melt at high temperatures provide excellent constituents in the resulting refractories. The carbon present in the refractories can possibly occur from the incomplete combustion of the binder, or come from the powdered graphite or from the furnace atmosphere.

In summary, this invention teaches that refractories having good thermal shock and strength properties can be obtained by sintering mixtures of alumina and aluminum while packed in powdered graphite. These bodies are highly refractory and exhibit no fusion, cracking, erosion, spalling, or failure at temperatures up to 3700° F. The results obtained herein are much greater than can be anticipated from a mere unprotected mixture of aluminum and alumina sintered in argon or other gases. The superiority of the bodies obtained by practicing the method disclosed by this invention is due in large measure, it is thought, to the formation during sintering of aluminum nitride from the aluminum in the mixtures, and possibly of carbon and a minor amount of aluminum oxide, providing additional materials in the resulting refractories which have high melting points.

What is claimed is:

1. A ceramic refractory material having good thermal shock resistance and a modulus of rupture in the range 800 to 12,400 lbs./in.$^2$, said material consisting of a molded mixture sintered in graphite in an oxidizing atmosphere and comprising 35 to 90% alumina and 10 to 65% aluminum prior to sintering, and showing aluminum, alumina, aluminum nitride, and carbon on X-ray analysis subsequent to sintering.

2. A ceramic material showing the presence of aluminum, alumina, aluminum nitride and carbon on X-ray analysis, and having good thermal shock resistance and a modulus of rupture of from 800 to 12,400 lbs./in.$^2$, and being the heat reaction product of sintering in graphite under an oxidizing atmosphere a mixture of from 35 to 90% by weight alumina in mesh sizes from 65 to 900, the balance of the mixture being aluminum.

3. A ceramic refractory material having good thermal shock resistance and a modulus of rupture in the range 800 to 12,400 lbs./in.$^2$, said material consisting of a molded mixture sintered in graphite in an oxidizing atmosphere and consisting of 35 to 90% alumina in mesh sizes from 65 to 900 and 10 to 65% aluminum in mesh sizes from 100 to 900 prior to sintering, and showing aluminum, alumina, aluminum nitride, and carbon upon X-ray analysis subsequent to sintering.

JACK M. LEPP.
JOHN A. SLYH.

REFERENCES CITED

The following references are of record in the file of this patent:

Metal Industry, May 14, 1948, pages 405–407.